United States Patent
Laxhuber

(10) Patent No.: US 8,581,473 B2
(45) Date of Patent: Nov. 12, 2013

(54) SYSTEM FOR USING THE AIR PRESSURE ACTING ON A VEHICLE IN MOTION TO PRODUCE ENERGY

(76) Inventor: Ludwig Laxhuber, Herrsching (DE)

( * ) Notice: Subject to any disclaimer, the term of this patent is extended or adjusted under 35 U.S.C. 154(b) by 310 days.

(21) Appl. No.: 13/058,037

(22) PCT Filed: Jul. 29, 2009

(86) PCT No.: PCT/EP2009/005500
§ 371 (c)(1),
(2), (4) Date: Apr. 5, 2011

(87) PCT Pub. No.: WO2010/015351
PCT Pub. Date: Feb. 11, 2010

(65) Prior Publication Data
US 2011/0181152 A1    Jul. 28, 2011

(30) Foreign Application Priority Data
Aug. 8, 2008  (EP) .................................... 08014236

(51) Int. Cl.
*H02N 2/18*  (2006.01)

(52) U.S. Cl.
USPC ......................................... 310/339; 310/319

(58) Field of Classification Search
CPC ....... H02N 2/18; F23Q 3/002; H01L 41/1136
USPC ................................................ 310/339, 319
See application file for complete search history.

(56) References Cited

U.S. PATENT DOCUMENTS

| 4,005,319 | A | | 1/1977 | Nilsson et al. |
| 4,254,843 | A | | 3/1981 | Han |
| 5,280,827 | A | * | 1/1994 | Taylor et al. ................... 180/165 |
| 5,386,146 | A | | 1/1995 | Hickey |
| 7,808,158 | B1 | * | 10/2010 | Deeds et al. ................... 310/339 |
| 2006/0082258 | A1 | * | 4/2006 | Mancosu et al. ............... 310/339 |
| 2008/0296904 | A1 | * | 12/2008 | Elahi ................................ 290/55 |
| 2009/0260438 | A1 | * | 10/2009 | Hedtke ............................ 73/579 |
| 2010/0026142 | A1 | * | 2/2010 | Jones et al. ..................... 310/339 |

FOREIGN PATENT DOCUMENTS

JP    2003-034203    2/2003

OTHER PUBLICATIONS

Internation Search Report and Written Opinion, issued Nov. 13, 2009, for PCT International Application No. PCT/EP2009/005500.
European Search Report, issued Jan. 15, 2009, for European Application No. 08014236.7-1523.

* cited by examiner

*Primary Examiner* — Derek Rosenau
*Assistant Examiner* — Bryan Gordon
(74) *Attorney, Agent, or Firm* — Pearl Cohen Zedek Latzer Baratz, LLP

(57) ABSTRACT

Embodiments of the present invention feature an energy conversion system to be installed on a vehicle, comprising a movably mounted surface resting on at least one deformable piezoelectric element. Air resistance force acting on the movably mounted surface, when the vehicle is moving, causes a mechanical deformation of the at least one deformable piezoelectric element, wherein the mechanical deformation produces electrical energy.

8 Claims, 1 Drawing Sheet

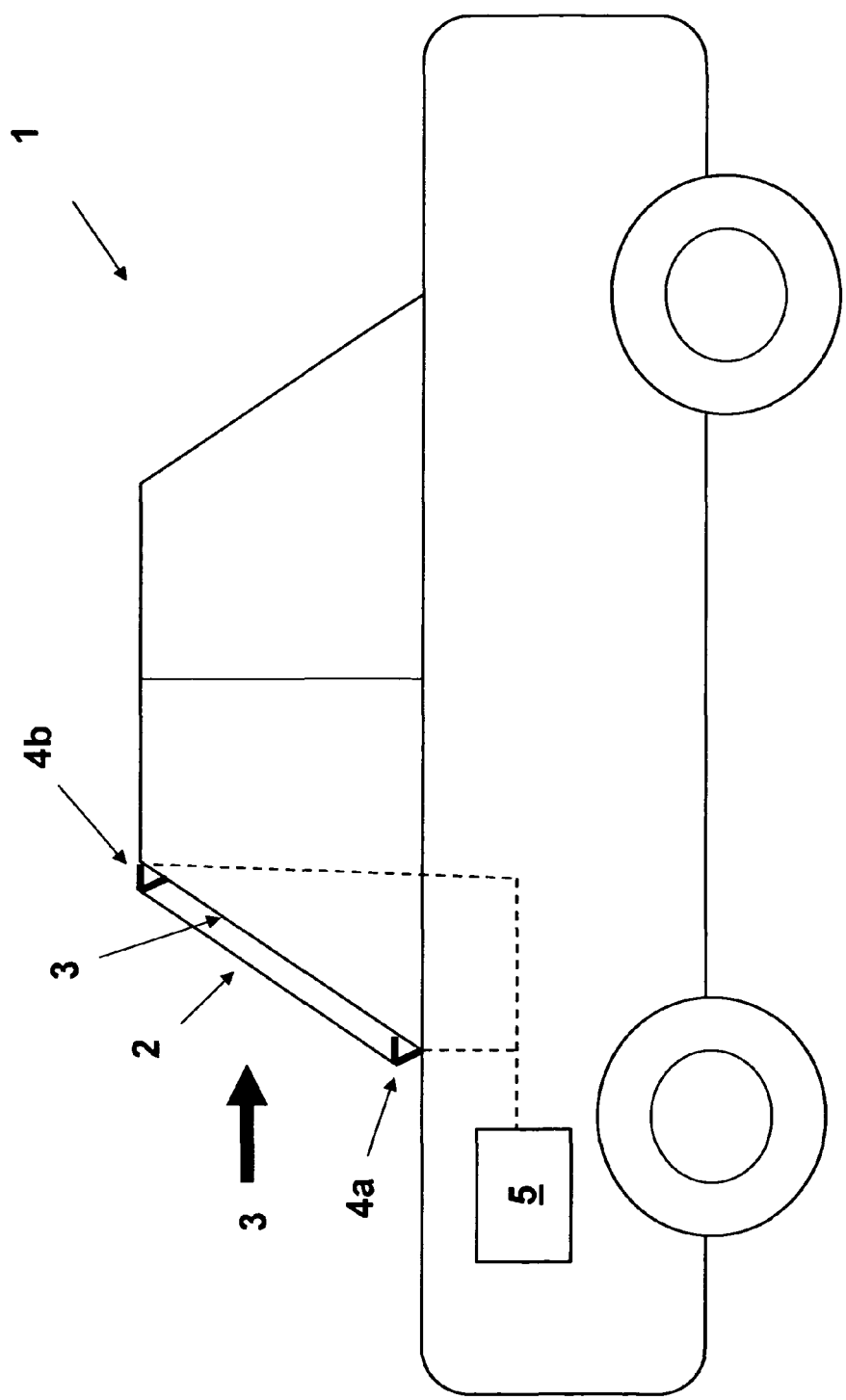

SYSTEM FOR USING THE AIR PRESSURE ACTING ON A VEHICLE IN MOTION TO PRODUCE ENERGY

CROSS-REFERENCE TO RELATED APPLICATIONS

This application is a National Phase Application of PCT International Application No. PCT/EP2009/005500, International Filing Date Jul. 29, 2009, claiming priority of European Patent Application EP 08014236.7, filed Aug. 8, 2008, both of which are incorporated herein by reference in their entirety.

FIELD OF THE INVENTION

The present invention relates to an energy conversion system configured to be installed on a vehicle, such as a car, and to use the air resistance acting on the vehicle, when in motion, and the energy conversion system installed thereon to produce energy.

BACKGROUND OF THE INVENTION

A moving vehicle is constantly being decelerated by the air resistance acting thereon. Thus, in order to overcome this constant deceleration the vehicle constantly consumes energy. There have been attempts to use the air resistance acting on a vehicle for transforming the energy of the air stream passing the moving vehicle into a usable form of energy that can be stored and used by the vehicle.

For instance, U.S. Pat. No. 4,254,843 discloses an electrically powered vehicle having a bank of batteries supplying electricity to an electric motor driving wheels of the vehicle including a whirl ventilator system, a clutch system and an automatically operated, engine-generator unit for recharging the batteries. The whirl ventilator system includes housings to produce a whirling air flow rotating a fan to drive an alternator such that air flow from movement of the vehicle generates electricity to charge the batteries. The clutch system includes a clutch mechanism coupling a drive shaft and a driven shaft to impart a driving force to the wheels when the drive shaft is rotated faster than the driven shaft and to couple the driven shaft with a flywheel when the driven shaft is rotating faster than the drive shaft, the flywheel driving an alternator such that momentum of the vehicle causes the alternator to charge the batteries. The automatically operated, engine-generator unit is started to charge the batteries when the level of charge therein has dropped below a predetermined level and stopped when the charge level reaches a second predetermined level.

U.S. Pat. No. 5,280,827 discloses an electric motor-driven vehicle having a large wind turbine mounted at the rear of the vehicle that rotates about an axis perpendicular to the axis of the vehicle body. A long venturi tube extends along the upper portion of the vehicle above the passenger cab and directs air flow from the front of the vehicle and impinges it upon an upper portion of the turbine blades. A pair of elongated lower screw-type turbines are contained in separate lower venturi effect tubes extending along the lower side of the vehicle below the passenger cab. Air from the lower venturi effect tubes is impinged upon the large turbine in a direction and at a location to increase the force generated from the upper venturi tube. The turbines drive one or more electric power generators coupled to storage batteries for recharging the batteries.

U.S. Pat. No. 5,386,146 discloses an in-line fluid medium driven charging system including a fluid medium driven generator disposed in a fluid medium directing tube. The fluid medium driven generator includes an auger shaped, fluid medium engaging member and is coupled to an electrical generator. Rotation of the auger shaped, fluid medium engaging member by intercepting a flow of a fluid medium causes rotation of the electrical generator, thereby generating electrical energy which recharges and assists in maintaining the life of a battery of a vehicle.

Although the above described systems use certain effects of the air resistance acting on a vehicle for transforming the energy of the air stream passing the moving vehicle into a usable form of energy, some air resistance effects have been neglected so far. Accordingly, it is an object of the present invention to provide for an energy conversion system that can be installed on a vehicle and is capable of using the air resistance force acting thereon, when the vehicle is moving, in a novel and advantageous manner.

SUMMARY OF THE INVENTION

In very general terms, the present invention provides for an energy conversion system that can be installed on a vehicle and can transform the energy within the air resistance force acting on the vehicle, when in motion, into a useable form of energy, such as electrical energy.

More specifically, according to a first aspect of the invention an energy conversion system is provided configured to be installed on a vehicle, preferably a car, such that a movably mounted surface of the energy conversion system is exposed to the air resistance force acting on the vehicle, when the vehicle is moving. The movably mounted surface is connected to a frame that can be fixedly attached to the chassis of the vehicle such that the movably mounted surface, being exposed, in use, to the generally variable air resistance force, can reciprocate in a sliding manner. Within the frame the movably mounted surface rests on at least one deformable piezoelectric element that defines a rest position of the movably mounted surface relative to the frame. When the vehicle is moving, an air resistance force acts on the energy conversion system installed thereon and the movably mounted surface thereof resting on the at least one deformable piezoelectric element causing a mechanical deformation of the at least one deformable piezoelectric element. The mechanical deformation of the at least one piezoelectric element produces electrical energy that can be stored, for instance, in an optional battery of the energy conversion system.

Preferably, the movably mounted surface is connected to the frame by means of a flexible peripheral sealing element for avoiding any entrance of air between the movably mounted surface and the frame.

Preferably, the movably mounted surface of the energy conversion system is configured to provide for the wind shield of a car.

Alternatively or additionally, the movably mounted surface of the energy conversion system is configured to provide for the cover(s) of the headlight(s) of a car.

According to a second aspect of the invention, a vehicle, preferably a car, is provided comprising an energy conversion system as described above.

Preferably the battery of the energy conversion system corresponds to the battery of the vehicle.

Further preferred embodiments of the above described first and second aspects of the present invention are defined in the additional dependent claims.

BRIEF DESCRIPTION OF THE DRAWING

FIG. 1 shows a schematic side view of a car comprising the energy conversion system according to the present invention.

DETAILED DESCRIPTION OF PREFERRED EMBODIMENTS

The present invention will now be further described by defining different aspects of the invention generally outlined above in more detail. Each aspect so defined may be combined with any other aspect or aspects unless clearly indicated to the contrary. In particular, any feature indicated as being preferred or advantageous may be combined with any other feature or features indicated as being preferred or advantageous.

Although in the preferred embodiment of the present invention described below the movably mounted surface exposed to the air resistance force provides for the wind shield of a car, the person skilled in the art will appreciate that the energy conversion system according to the present invention can also be advantageously employed in an embodiment where the movably mounted surface exposed to the air resistance force provides for the headlights of a car or other suitable surfaces that are exposed to the air resistance force, when the car or the vehicle is moving.

FIG. 1 shows a schematic view of a conventional car 1 being equipped with an energy conversion system according to the present invention. Preferably, the energy conversion system according to the present invention provides for the wind shield 2 of the car 1 for utilizing the air resistance force (schematically indicated by the arrow 3) acting on the wind shield 2, when the car 1 is moving. The wind shield 2 is slidably mounted within a frame 3 fixedly connected to the chassis of the car 1. Within this frame 3 the slidably movable wind shield 2 movably rests on a plurality of piezoelectric elements 4a, 4b so that the air resistance force acting on the car 1, when in motion, and the slidably mounted wind shield 2 of the energy conversion system causes a mechanical deformation of the piezoelectric elements 4a, 4b. The mechanical deformation of the piezoelectric elements 4a, 4b produces electrical energy that can be stored, for instance, in the battery 5 of the car 1.

In a preferred embodiment the wind shield 2 is connected to the frame 3 by means of a flexible peripheral sealing element (not shown) so that it can be ensured that no air enters the inside of car 1 through the gap between the wind shield 2 and the frame 3.

The air resistance force $F_r$ acting on the wind shield 2 having a surface area A can be estimated according to the following equation: $F_r = \frac{1}{2} \times C_w \times \rho_A \times A \times v^2$, wherein $C_w$ is the drag coefficient, $\rho_A$ the air density and v the speed of the car 1. Accordingly, the air resistance force $F_r$ acting on the car 1 is strongly dependent on its velocity v, namely a quadratic relation.

The person skilled in the art will appreciate that the piezoelectric elements 4a, 4b will only produce electrical energy when being deformed. Thus, in case the car 1 moves with a constant speed the piezoelectric elements 4a, 4b will produce a substantial amount of energy only until they have reached their equilibrium position, i.e. that position where the air resistance force acting on the wind shield 2 and the piezoelectric elements 4a, 4b supporting the same is counterbalanced by the mechanical force caused by the piezoelectric elements 4a, 4b resisting a further deformation.

However, in reality the speed of a car rarely is constant, such as in city traffic. Thus, in the case of a temporally variable velocity of the car and, hence, a temporally variable air resistance force acting on the car, the piezoelectric elements 4a, 4b will react to this temporally variable air resistance force acting on the wind shield 2 by deforming and expanding accordingly. Each time the car 1 is being accelerated or decelerated, i.e. the velocity is changed, the piezoelectric elements 4a, 4b will deform and produce an electrical signal which can be stored as electrical energy by the battery 5 of the car 1.

Moreover, even in case of an approximately constant velocity of the car 1, the wind shield 2 being slidably supported by the frame 3 and the piezoelectric elements 4a and 4b can freely perform an oscillating motion. For instance, the mechanical and acoustical oscillations caused by the engine of the car 1 also act on the slidably supported wind shield 2 and will lead to a corresponding oscillating motion thereof. These oscillations of the wind shield 2 cause a corresponding variable deformation and expansion of the piezoelectric elements 4a and 4b and, thus, a variable transformation of mechanical energy into electrical energy. Although the amplitude of these oscillations is much smaller than the amplitude in case of a substantial acceleration or deceleration of the car 1, the person skilled in the art nevertheless will appreciate that, because these small oscillating motions have much higher frequencies (e.g. about hundred to thousand oscillations per second), the small amounts of energies produced by these small oscillations will add up to substantial amounts of energy over longer periods of time.

The present invention, as described in detail above, is not limited to the particular devices, uses and methodology described as these may vary. For instance, the person skilled in the art will appreciate that although the energy conversion system according to the present invention has been described above in the context of a car, the present invention, in principle, can be advantageously applied to other vehicles as well, such as trucks, trains, ships, airplanes and the like. Moreover, instead of harvesting the air pressure acting on the wind shield of the car, the energy conversion system according to the present invention likewise could be implemented as the headlights of a car.

It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

The invention claimed is:

1. An energy conversion system configured to be installed on a vehicle (1), such that a movably mounted surface (2) of the energy conversion system is exposed to an air resistance force acting on the vehicle (1), when the vehicle is moving, wherein the movably mounted surface (2) is connected to a frame (3) fixedly attachable to the chassis of the vehicle (1) such that the movably mounted surface (2) being exposed, in use, to the air resistance force can reciprocate in a sliding manner, wherein within the frame (3) the movably mounted surface (2) rests on at least one deformable piezoelectric element (4a, 4b) that defines a rest position of the movably mounted surface (2) relative to the frame (3) such that, when the vehicle (1) is moving, the air resistance force acting on the movably mounted surface (2) resting on the at least one deformable piezoelectric element (4a, 4b) causes a mechanical deformation of the at least one deformable piezoelectric element (4a, 4b), wherein the mechanical deformation of the at least one piezoelectric element (4a, 4b) produces electrical energy.

2. System according to claim 1, wherein the system further comprises a battery (5) for storing the electrical energy produced by the at least one piezoelectric element (4a, 4b).

3. System according to claim 1, wherein the movably mounted surface (2) is connected to the frame (3) by means of a flexible peripheral sealing element for avoiding any entrance of air between the movably mounted surface (2) and the frame (3).

4. System according to claim 1, wherein the movably mounted surface (2) is configured to provide for the wind shield of a car (1).

5. System according to claim 1, wherein the movably mounted surface (2) is configured to provide for the cover of a headlight of a car.

6. Vehicle comprising an energy conversion system according to any one of the preceding claims.

7. Vehicle according to claim 6, wherein the vehicle comprises a battery and the battery of the energy conversion system corresponds to the battery of the vehicle.

8. Vehicle according to claim 6 or 7, wherein the vehicle is a car.

* * * * *